United States Patent
Pan (10) Patent No.: US 9,331,541 B2
(45) Date of Patent: May 3, 2016

(54) MOTOR STRUCTURE

(71) Applicant: ASIA VITAL COMPONENTS CO., LTD., Sinjhuang District, New Taipei (TW)

(72) Inventor: Jin-Song Pan, New Taipei (CN)

(73) Assignee: ASIA VITAL COMPONENTS CO., LTD., New Taipei (TW)

( * ) Notice: Subject to any disclaimer, the term of this patent is extended or adjusted under 35 U.S.C. 154(b) by 373 days.

(21) Appl. No.: 13/933,098

(22) Filed: Jul. 1, 2013

(65) Prior Publication Data

US 2015/0001974 A1    Jan. 1, 2015

(51) Int. Cl.
*H02K 5/08* (2006.01)
*H02K 3/52* (2006.01)

(52) U.S. Cl.
CPC ..................................... *H02K 3/522* (2013.01)

(58) Field of Classification Search
None
See application file for complete search history.

(56) References Cited

U.S. PATENT DOCUMENTS

| | | | | |
|---|---|---|---|---|
| 3,780,323 A | * | 12/1973 | Swain | H02K 3/325 310/194 |
| 6,573,632 B2 | * | 6/2003 | Hsu | H02K 1/148 310/194 |
| 7,586,231 B2 | * | 9/2009 | Wang | H02K 3/522 310/194 |
| 2012/0104893 A1 | * | 5/2012 | Kitaori | H02K 15/0075 310/195 |

* cited by examiner

*Primary Examiner* — Tran Nguyen (57) ABSTRACT

A motor structure includes a first silicon steel seat, at least one insulation support and a second silicon steel seat. The first silicon steel seat has a receiving space. The insulation support is disposed in the receiving space. The insulating support has a winding section. A first protection wall section and a second protection wall section are respectively formed on two sides of the winding section. The second protection wall section is formed with multiple through holes. Two ends of the second protection wall section are respectively formed with a first channel and a second channel. The second silicon steel seat is assembled and connected with the second protection wall section. The manufacturing cost of the motor structure is lowered and the manufacturing process of the motor structure is simplified.

7 Claims, 11 Drawing Sheets

MOTOR STRUCTURE

BACKGROUND OF THE INVENTION

1. Field of the Invention

The present invention relates generally to an improved motor structure, and more particularly to a motor structure, which is manufactured at much lower cost and by a simplified process.

2. Description of the Related Art

In recent years, along with the development of electronic industries, the performance of various electronic components has become higher and higher and the processing speed of the electronic components has become faster and faster. Moreover, the operation speed of the internal chipsets of the electronic components has been more and more increased and the number of the chips has been more and more increased. As a result, the heat generated by the chips in operation also has become higher and higher. In the case that the heat is not dissipated in time, the performance of the electronic components will be greatly affected and the operation speed of the electronic components will be lowered. In some more serious cases, the electronic components may even burn out due to high heat. Accordingly, it has become a critical topic how to efficiently dissipate the heat generated by the electronic components.

In the heat dissipation devices, with a cooling fan taken as an example, the cooling fan is able to quickly remove the heat absorbed by the radiating fin assembly and achieve a good heat dissipation effect. Therefore, the cooling fan is an inevitable heat dissipation component.

Figure 1A:
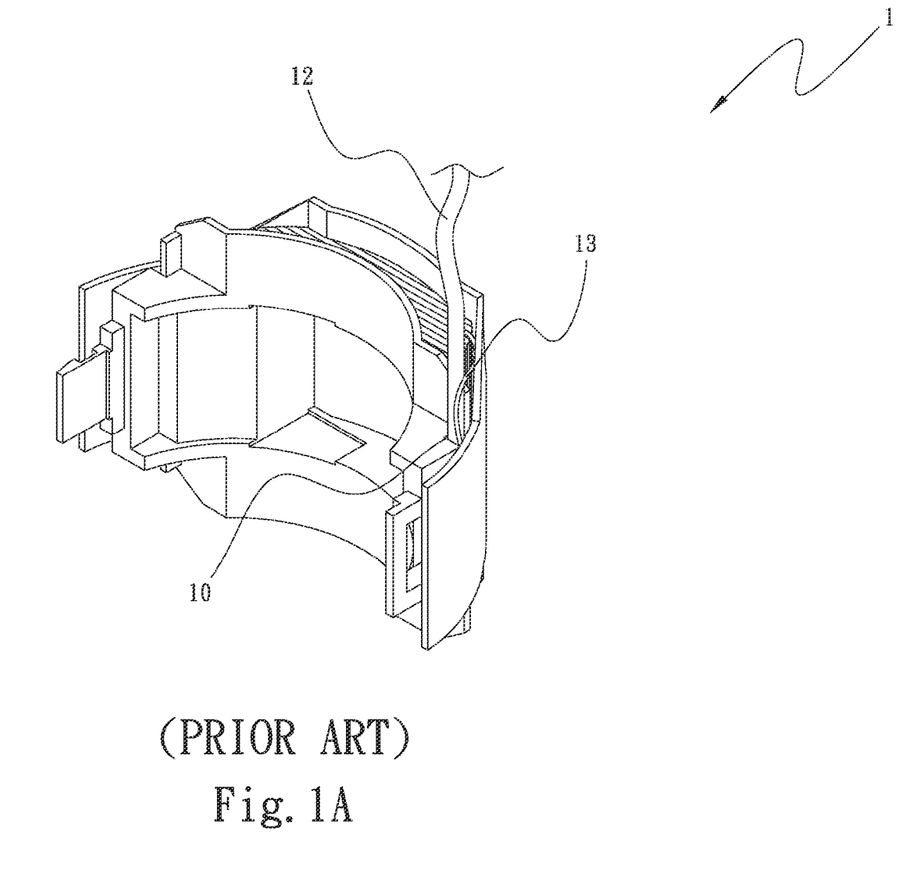
FIG. 1A is a perspective view of a conventional motor structure.

A conventional cooling fan is mainly composed of a rotor assembly, a stator assembly and a fan circuit board. The rotor assembly is disposed on one side of the stator assembly, while the fan circuit board is disposed on the other side of the stator assembly. The stator assembly includes a first silicon steel seat, a second silicon steel seat and at least one insulation support. The insulation support 1 has at least one cavity 10 (as shown in FIG. 1A). After the wire 12 and the windings 13 are soldered, one end of the wire 12 is pressed into the cavity 10 and bent one time to be located on the insulation support 1. In this wiring manner, the wire 12 is simply bent one time to be fixed on the insulation support 1 so that the tensile strength of the wire 12 is poor. In the case that the gap of the cavity 10 is too large, the wire 12 is likely to be pulled out and loosened. Therefore, although the wire 12 can be fixed in the above manner to lower the cost, such arrangement will affect the successive manufacturing process.

Figure 1B:
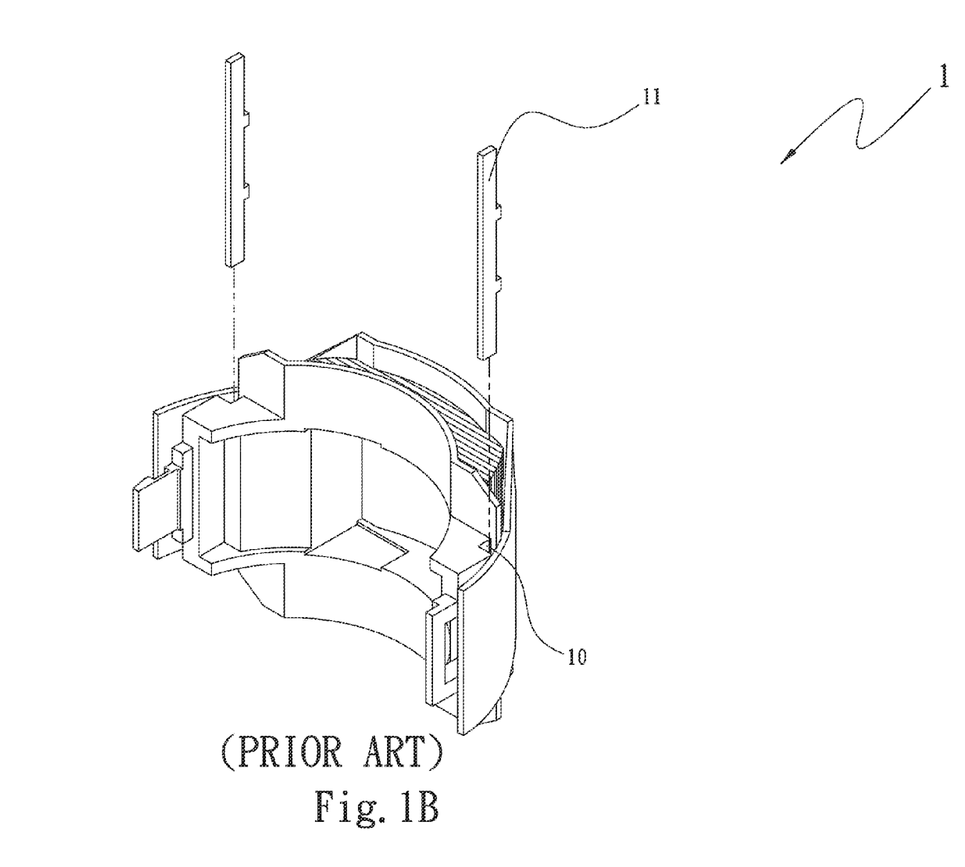
FIG. 1B is a perspective view of another conventional motor structure.
Figure 1C:
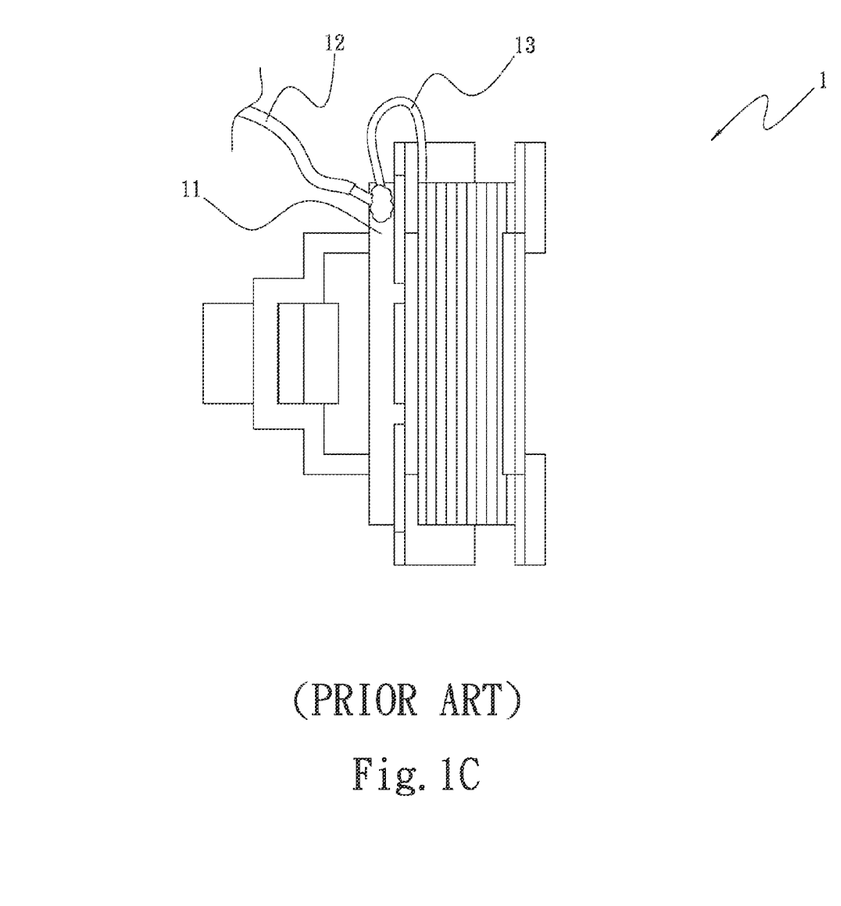
FIG. 1C is a plane view of the other conventional motor structure.

Some manufacturers have developed another measure for fixing the wire. Please refer to FIGS. 1B and 1C. A wire connection terminal 11 is fixedly disposed in the cavity 10. One end of the wire 12 is soldered on the wire connection terminal 11. In such manner, the wire 12 and the windings 13 can be easily fixed on the insulation support 1. However, the additional wire connection terminal 11 will lead to increase of manufacturing cost. Furthermore, the insulation support 1 is made of polymer material, which is subject to deformation at high temperature. Therefore, when the wire 12 and the windings 13 are soldered at high temperature, the insulation support 1 will deform. Under such circumstance, the wire connection terminal 11 fixed in the cavity 10 of the insulation support 1 will loosen. Moreover, the soldered section (the soldering point) of the wire 12 and the windings 13 is exposed to outer side of the cavity 10 of the insulation support 1. This is highly dangerous.

According to the above, the conventional cooling fan has the following shortcomings:

1. The cost is higher.
2. The manufacturing process is complicated.
3. The tensile strength is poor.
4. The dangerousness is higher.

SUMMARY OF THE INVENTION

It is therefore a primary object of the present invention to provide an improved motor structure, which is manufactured at much lower cost and by a simplified process.

It is a further object of the present invention to provide the above motor structure, in which the tensile strength of the wire is increased.

It is still a further object of the present invention to provide the above motor structure, which can be used in higher security.

To achieve the above and other objects, the motor structure of the present invention includes a first silicon steel seat, at least one insulation support and a second silicon steel seat. The first silicon steel seat has a receiving space. The insulation support is disposed in the receiving space. The insulating support has a winding section. A first protection wall section and a second protection wall section are respectively formed on two sides of the winding section. The second protection wall section is formed with multiple through holes. Two ends of the second protection wall section are respectively formed with a first channel and a second channel. The second silicon steel seat is assembled and connected with the second protection wall section.

After the wire is soldered with the windings, the wire and the windings are inlaid in the first channel. Then the wire is 180-degree bent and inlaid in the second channel. Then the other end of the wire is conducted out through the through hole. Accordingly, the wire is twice bent and securely fixed on the insulation support. The insulation support is formed with the first and second channels and the through hole for fixing the wire instead of the wire connection terminal of the conventional structure. Accordingly, the manufacturing cost is lowered and the manufacturing process is simplified.

Also, the soldering point of the wire 24 and the windings is inlaid in the first channel without being exposed to outer side so that the insulation is secured to ensure safety.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 2A:
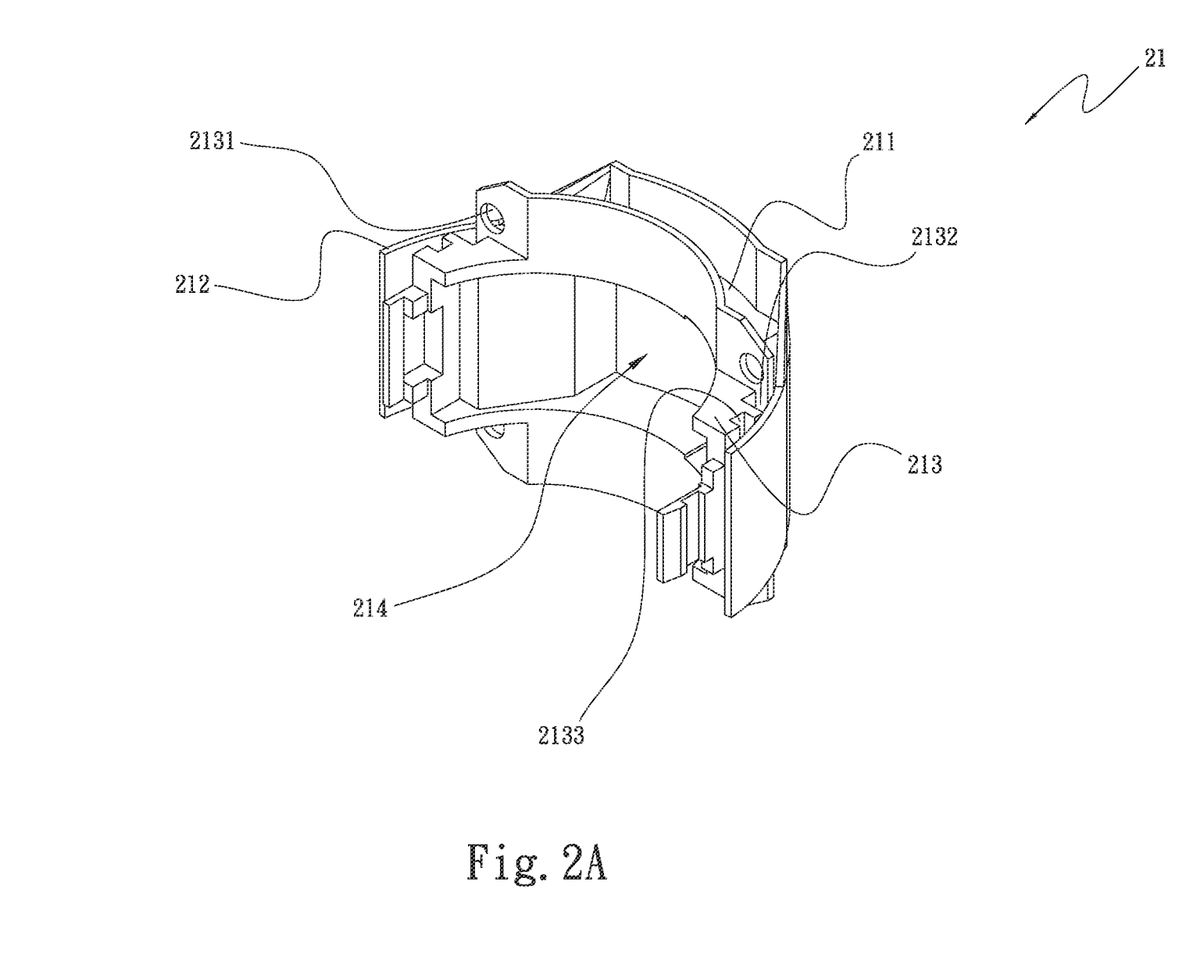
FIG. 2A is a perspective view of the insulation support of a first embodiment of the motor structure of the present invention.
Figure 2B:
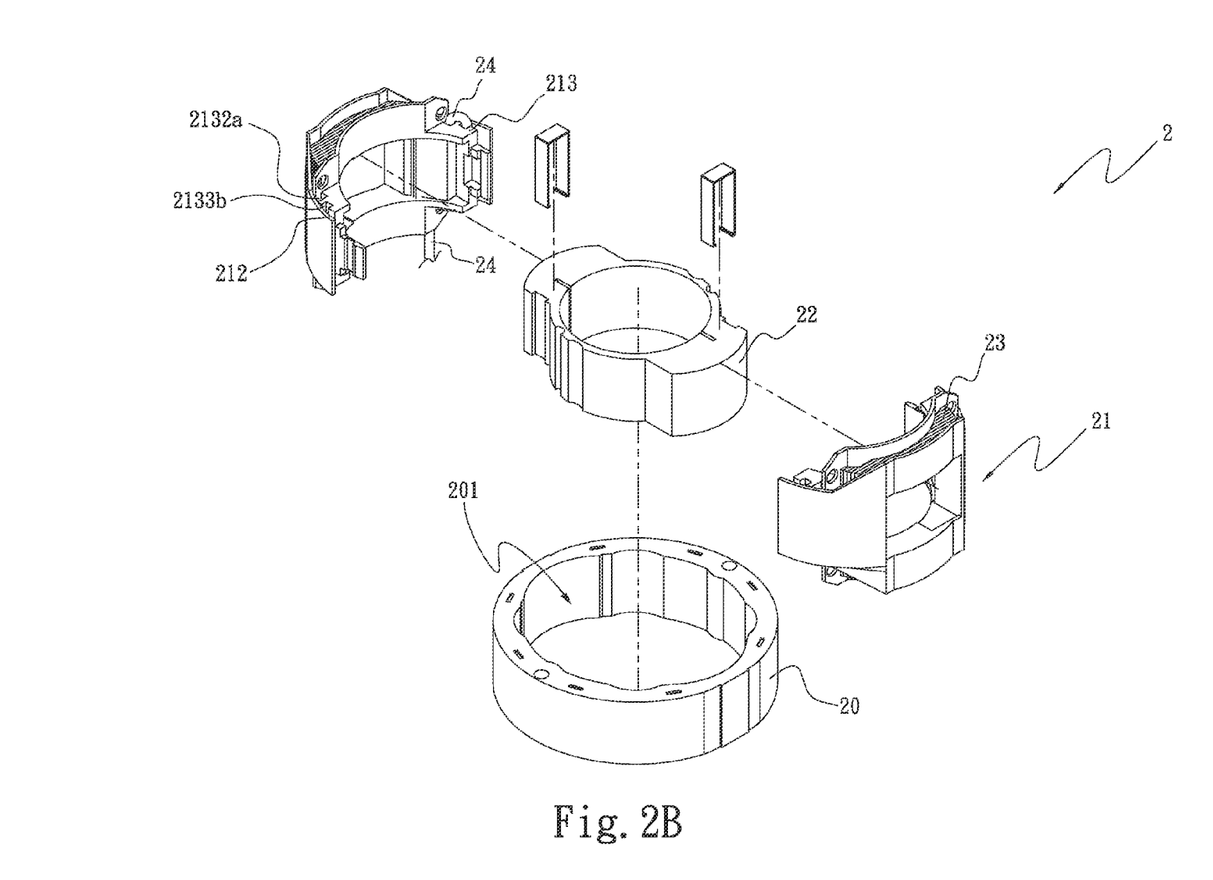
FIG. 2B is a perspective exploded view of the first embodiment of the motor structure of the present invention.
Figure 2C:
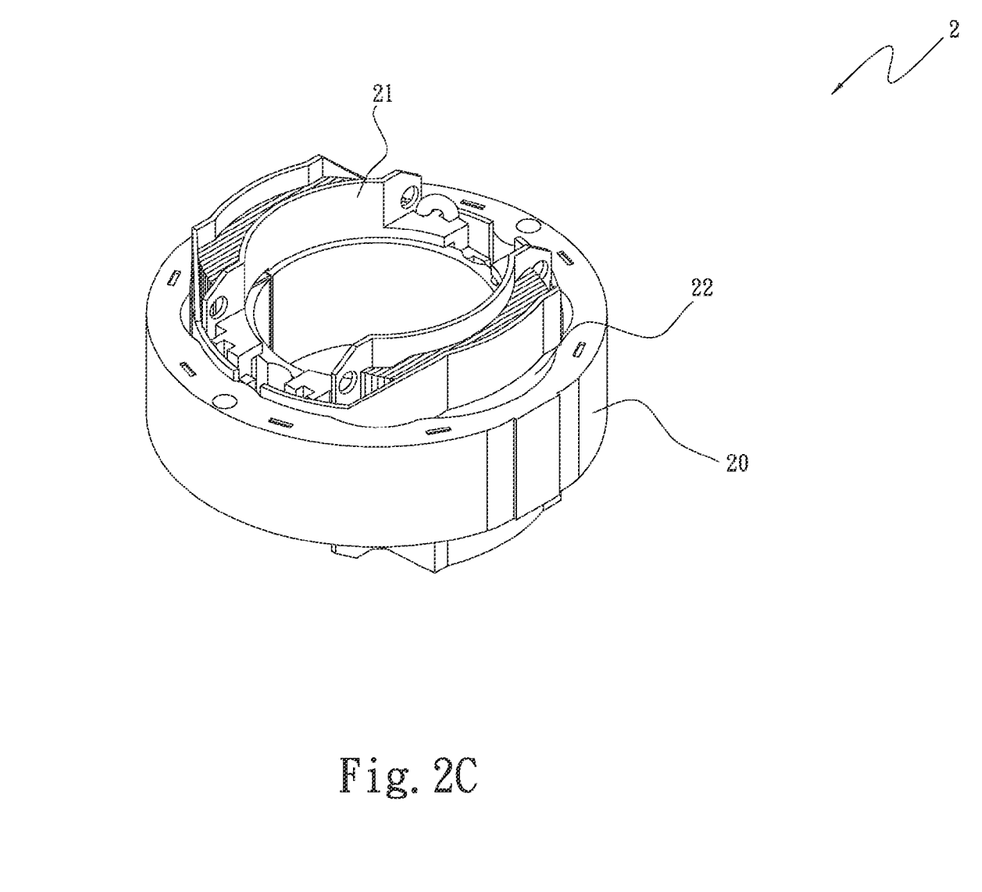
FIG. 2C is a perspective assembled view of the first embodiment of the motor structure of the present invention.
Figure 2D:
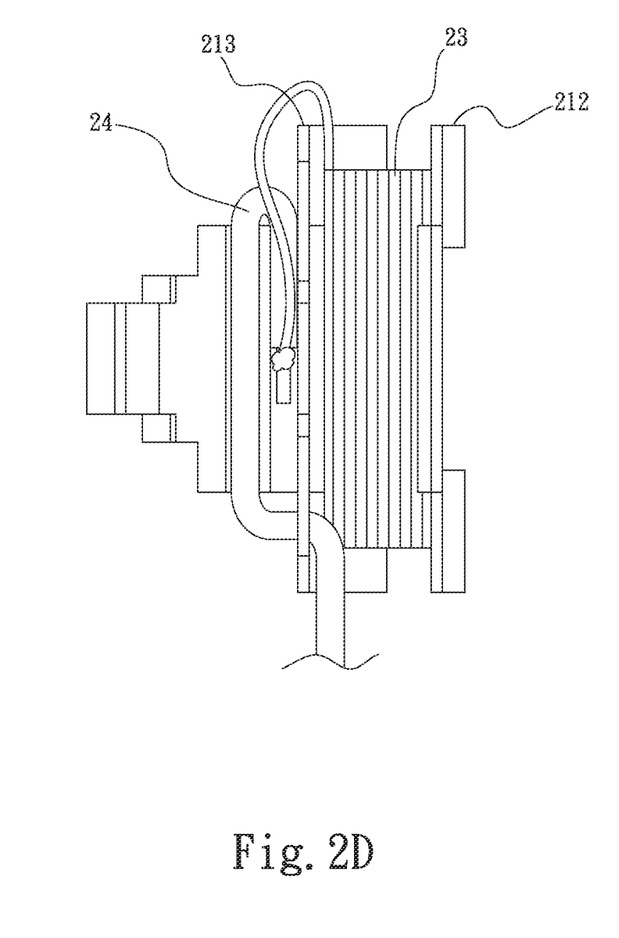
FIG. 2D is a plane view of the first embodiment of the motor structure of the present invention.

Please refer to FIGS. 2A, 2B, 2C and 2D. FIG. 2A is a perspective view of the insulation support of a first embodiment of the motor structure of the present invention. FIG. 2B is a perspective exploded view of the first embodiment of the motor structure of the present invention. FIG. 2C is a perspective assembled view of the first embodiment of the motor structure of the present invention. FIG. 2D is a plane view of the first embodiment of the motor structure of the present invention. According to the first embodiment, the motor structure 2 of the present invention includes a first silicon steel seat 20, at least one insulation support 21 and a second silicon steel seat 22. The first silicon steel seat 20 has a receiving space 201. The insulation support 21 is disposed in the receiving space 201. The insulation support 21 has a winding section 211. A first protection wall section 212 and a second protection wall section 213 are respectively formed on two sides of the winding section 211. Multiple windings 23 are wound on the winding section 211 between the first and second protection wall sections 212, 213. The second protection wall section 213 is formed with multiple through holes 2131. Two ends of the second protection wall section 213 are respectively sequentially formed with a first channel 2132 and a second channel 2133. The insulation support 21 further has a locating hole 214 passing through the winding section 211, the first protection wall section 212 and the second protection wall section 213.

The second silicon steel seat 22 is extended into the locating hole 214 and assembled with the second protection wall section 213.

After the first and second silicon steel seats 20, 22 and the insulation support 21 are assembled, the first protection wall section 212 of the insulation support 21 is attached to the second protection wall section 213 to define a first passage 2132a and a second passage 2133b with the first and second channels 2132, 2133 respectively.

After one end of the wire 24 is tangled with the windings 23, the wire 24 is fixedly soldered with the windings 23. After soldered, the wire 24 is conducted through the first passage 2132a and inlaid in the first channel 2132 by such a depth that the soldering point is entirely sunk into the first channel 2132 without being exposed to outer side. The other end of the wire 24 is 180-degree bent and conducted through the second passage 2133b and inlaid in the second channel 2133. Then the wire 24 is conducted out through the through hole 2131. Accordingly, the wire 24 is twice bent to enhance the tensile strength of the wire 24 so that the wire 24 can be securely fixed on the insulation support 21. The insulation support 21 is formed with the first and second channels 2132, 2133 and the through hole 2131 for fixing the wire 24 instead of the wire connection terminal of the conventional structure. Accordingly, the manufacturing cost is lowered and the manufacturing process is simplified.

Also, the soldering point of the end of the wire 24 and the windings 23 is inlaid in the first channel 2132 so that the insulation is secured to ensure safety.

Figure 3A:
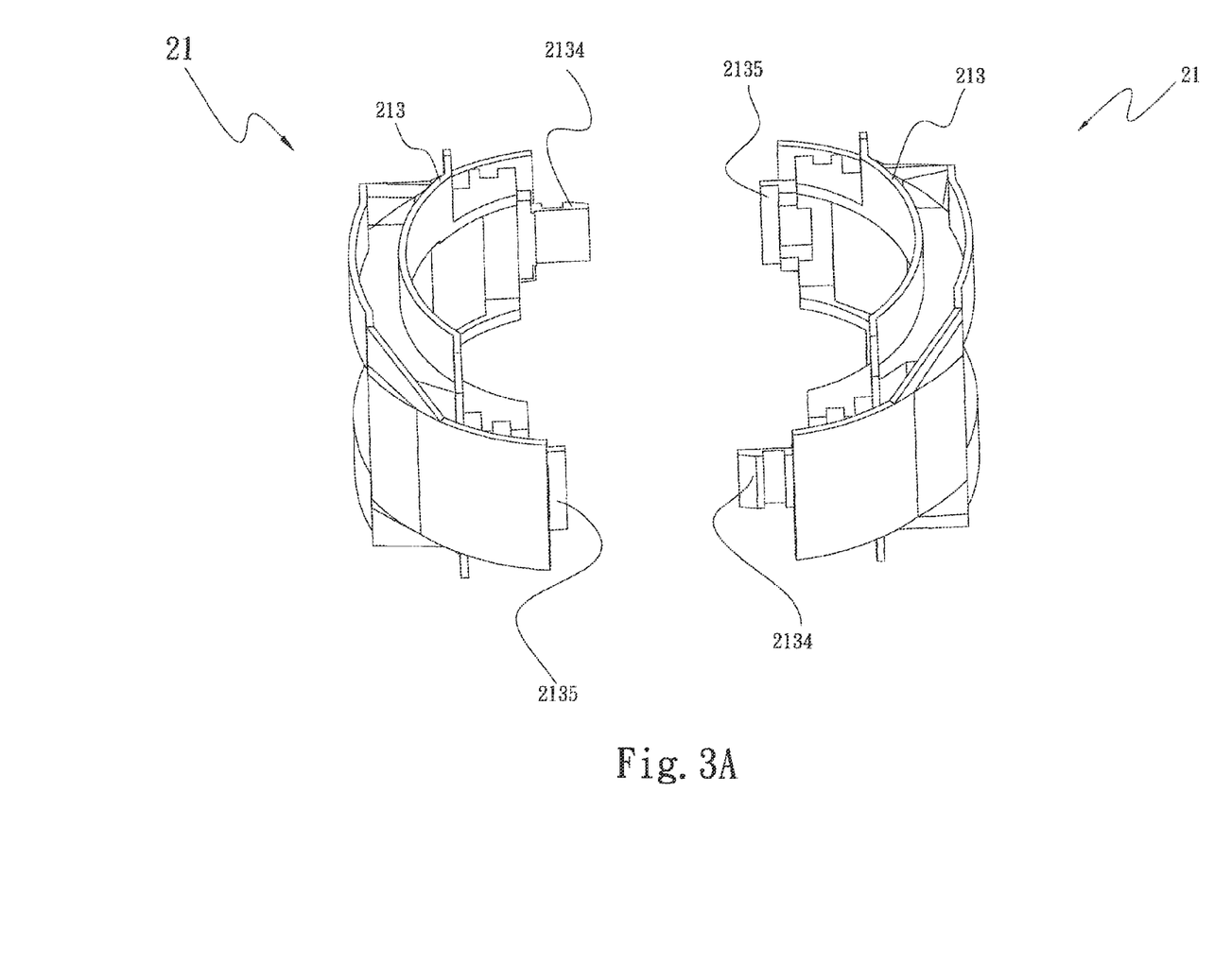
FIG. 3A is a perspective view of a second embodiment of the motor structure of the present invention.
Figure 3B:
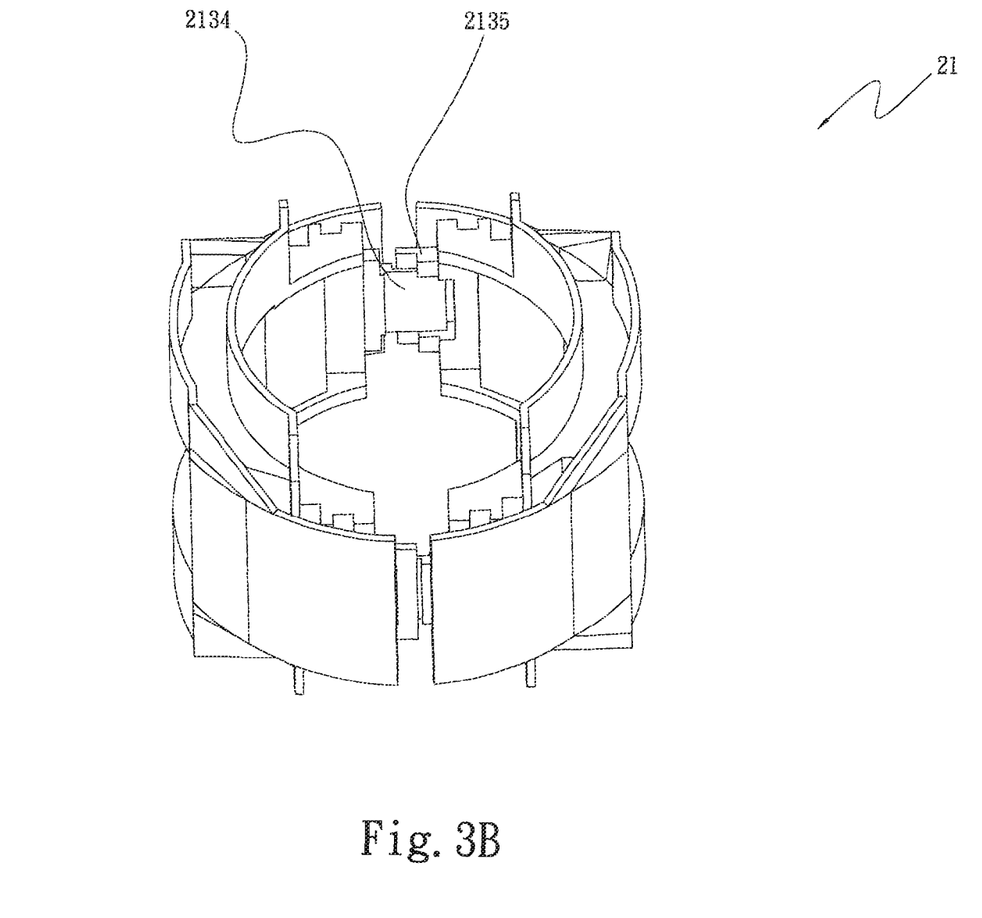
FIG. 3B is a perspective assembled view of the second embodiment of the motor structure of the present invention.

Please now refer to FIGS. 3A and 3B as well as FIGS. 2A and 2B. FIG. 3A is a perspective view of a second embodiment of the motor structure of the present invention. FIG. 3B is a perspective assembled view of the second embodiment of the motor structure of the present invention. The second embodiment is partially identical to the first embodiment in component and relationship between the components and thus will not be repeatedly described hereinafter. The second embodiment is different from the first embodiment in that two ends of the second protection wall section 213 are respectively sequentially outward formed with a first channel 2132 and a second channel 2133. In addition, an assembling section 2134 and a connection section 2135 are respectively formed at two ends of the second protection wall section 213. By means of the assembling sections 2134 and the connection sections 2135, the second protection wall sections 213 of two insulation supports 21 can be securely latched with each other. In this case, the insulation support 21 can be more securely received in the receiving space 201 of the first silicon steel seat 20.

Figure 4:
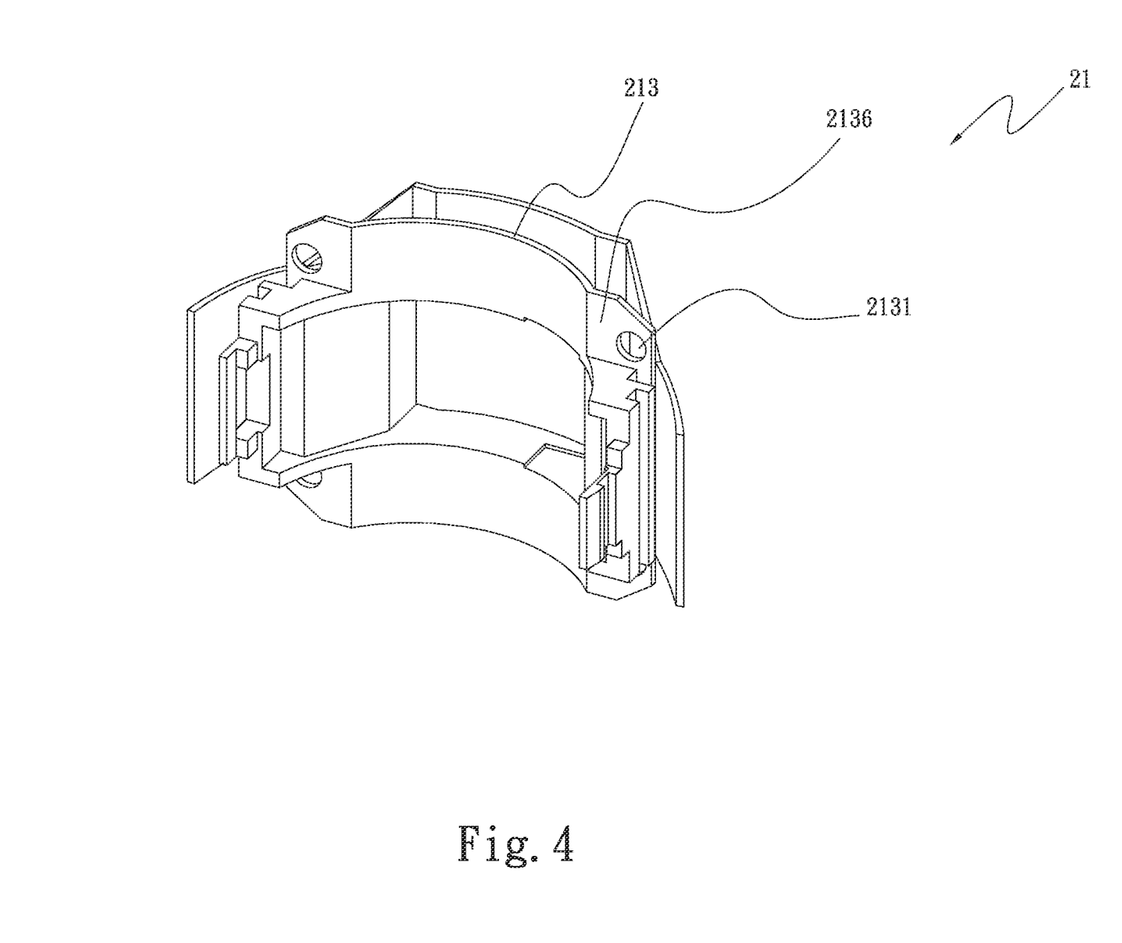
FIG. 4 is a perspective view of a third embodiment of the motor structure of the present invention.

Please now refer to FIG. 4 as well as FIGS. 2A and 2B. FIG. 4 is a perspective view of a third embodiment of the motor structure of the present invention. The third embodiment is partially identical to the first embodiment in component and relationship between the components and thus will not be repeatedly described hereinafter. The third embodiment is different from the first embodiment in that the second protection wall section 213 has an end face 2136 and the through hole 2131 is formed through the end face 2136. After the wire 24 is sequentially inlaid in the first and second channels 2132, 2133, the wire 24 is conducted out through the through hole 2131. Accordingly, the wire 24 is twice bent to enhance the tensile strength of the wire 24 so that the wire 24 can be securely fixed on the insulation support 21. The insulation support 21 is formed with the first and second channels 2132, 2133 and the cooperative through hole 2131 for fixing the wire 24 instead of the wire connection terminal of the conventional structure. Accordingly, the manufacturing cost is lowered and the manufacturing process is simplified.

Figure 5:
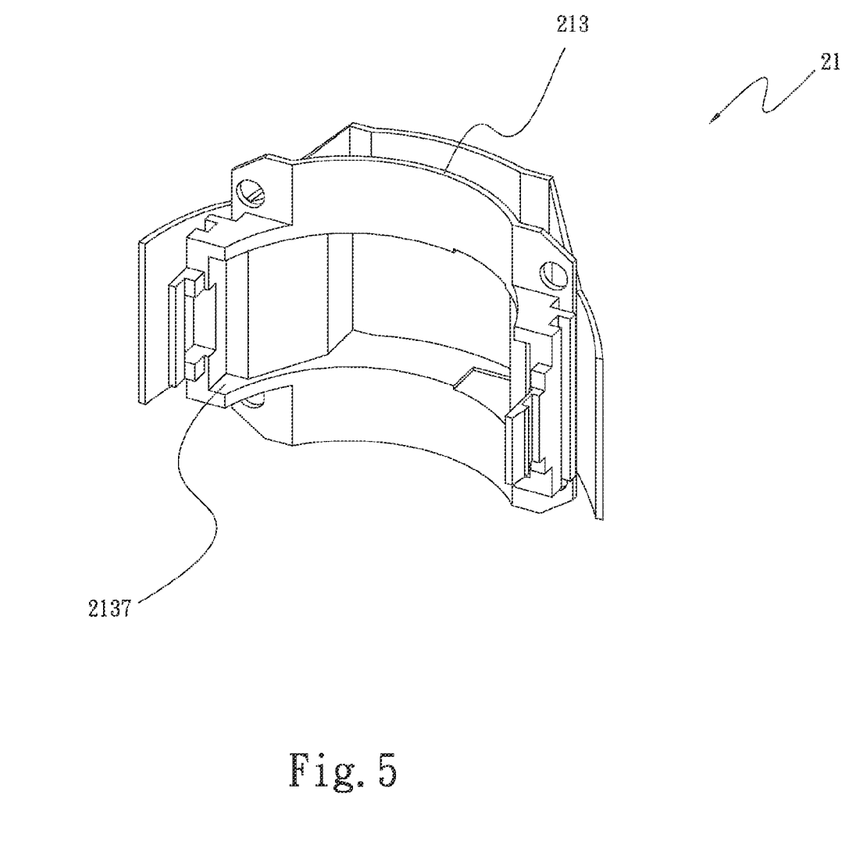
FIG. 5 is a perspective view of a fourth embodiment of the motor structure of the present invention.

Please now refer to FIG. 5 as well as FIGS. 2A and 2B. FIG. 5 is a perspective view of a fourth embodiment of the motor structure of the present invention. The fourth embodiment is partially identical to the first embodiment in component and relationship between the components and thus will not be repeatedly described hereinafter. The fourth embodiment is different from the first embodiment in that the second protection wall section 213 has multiple rest sections 2137 inward extending from the positions of the first and second channels 2132, 2133 for locating the second silicon steel seat 22. By means of the rest sections 2137, the second silicon steel seat 22 can be more securely assembled with the insulation support 21 and located.

In conclusion, in comparison with the conventional structure, the present invention has the following advantages:
1. The cost is lowered.
2. The manufacturing process is simplified.
3. The tensile strength of the wire is enhanced.
4. The safety is ensured.

The present invention has been described with the above embodiments thereof and it is understood that many changes and modifications in the above embodiments can be carried out without departing from the scope and the spirit of the invention that is intended to be limited only by the appended claims.

What is claimed is:
1. A motor structure comprising:
   a first silicon steel seat having a receiving space;
   at least one insulation support disposed in the receiving space, the insulation support having at least one winding section, a first protection wall section and a second protection wall section being respectively formed on two sides of the winding section, the second protection wall section being formed with multiple through holes, two ends of the second protection wall section being respectively formed with a first channel and a second channel, a first passage and a second passage being respectively defined with the first channel and the second channel, an assembling section and a connection section being respectively formed at two ends of the second protection wall section; and a second silicon steel seat assembled and connected with the second protection wall section.

2. The motor structure as claimed in claim 1, wherein two ends of the second protection wall section are respectively sequentially outward formed with the first channel and the second channel.

3. The motor structure as claimed in claim 1, wherein the insulation support further has a locating hole passing through the winding section, the first protection wall section and the second protection wall section.

4. The motor structure as claimed in claim 1, wherein the second protection wall section has an end face and the through hole is formed through the end face.

5. The motor structure as claimed in claim 3, wherein the second silicon steel seat is extended into the locating hole and assembled with the second protection wall section.

6. The motor structure as claimed in claim 1, wherein multiple windings are wound on the winding section between the first and second protection wall sections.

7. The motor structure as claimed in claim 1, wherein the second protection wall section has multiple rest sections inward extending from positions of the first and second channels for locating the second silicon steel seat.

* * * * *